Patented Feb. 21, 1933

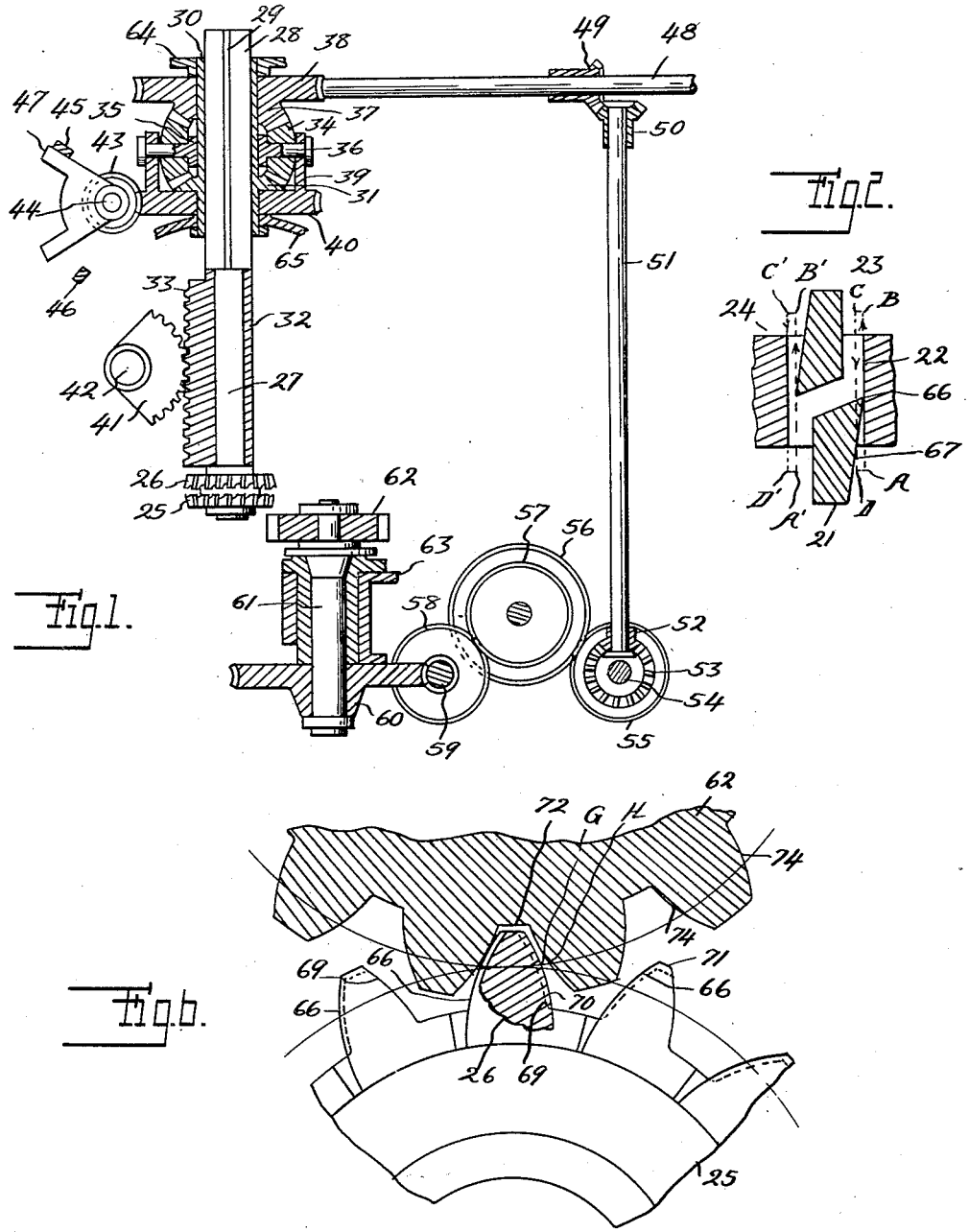

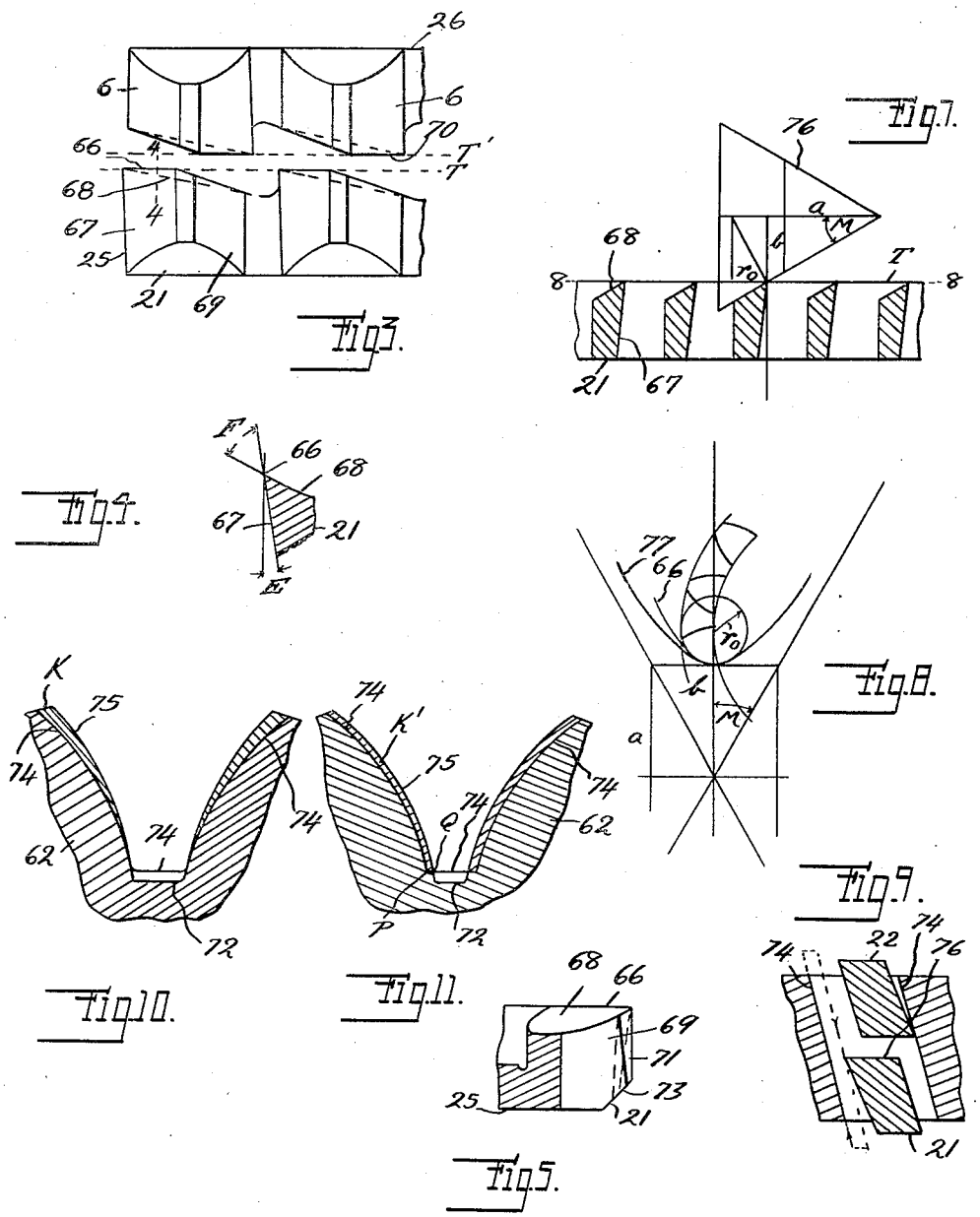

1,898,154

UNITED STATES PATENT OFFICE

NIKOLA TRBOJEVICH, OF DETROIT, MICHIGAN

METHOD OF GEAR CUTTING

Application filed April 16, 1930. Serial No. 444,823.

The invention relates to a novel method of gear cutting by means of reciprocating pinion cutters.

The invention resides in an arrangement whereby two specially constructed pinion type cutters are mounted upon the same ram and alternately engage the gear to be cut both upon the incoming as well as the outgoing strokes. My method is particularly adapted to finish cutting of spur and helical gears which were previously roughed out by some other method or means.

The principal object of this invention is to overcome the difficulty which now exists in the way of providing the well known Fellows cutters with proper cutting rakes in order that tough and hard materials may be accurately and rapidly machined. According to the practice now prevailing the ordinary Fellows cutters may be readily sharpened by "hooking" them so that the tops of cutting teeth will have an efficient cutting action. However, nothing has been or could be done to my knowledge to similarly improve the cutting efficiency of the flanks which are exclusively used during the finish cutting process. My solution to this problem as well as the other objects and advantages of this method will now be fully explained.

In the drawings

Figure 1 is a diagrammatic representation of my improved gear shaping machine;

Figure 2 is a diagram explaining the principle upon which the method is based;

Figure 3 is a fragmentary side view of two improved cutters relatively superposed and intended to cooperate according to this method;

Figure 4 shows the formation of the cutting edge in the plane 4—4, Figure 3;

Figure 5 shows the cutting edge in side view and also shows two methods of forming the outer circumference of the cutter;

Figure 6 is a fragmentary plan view of the improved cutter as seen from the plane 6—6, Figure 3;

Figure 7 is pitch plane development of the cutter showing the method of sharpening the lip surfaces by means of a conical grinder;

Figure 8 is a section in plane 8—8 of Figure 7 showing the method of approximating an involute in a plane by means of a conical section;

Figure 9 is a diagram showing the adaptation of this principle to generating of helical gears;

Figures 10 and 11 are detail views showing two methods of roughing out gear teeth previous to finish cutting by my improved method.

The principle upon which this method of gear shaping is based is illustrated in Figure 2. The cutting tooth 21 is moving upwards in the line A B which is the length of the stroke and thereby cuts the flank 22 while the cutter 23 traverses the path A' B' in unison with the first cutter and does not touch the flank 24 during the said stroke. Upon arriving at the end of the stroke at the points B and B' respectively, both cutters are shifted over to the left through the distances BC=B'C' in order that upon the downward stroke CB=C'D' the cutter 23 may engage the opposite flank 24 while the cutter 21 will remain idle during that period.

This reciprocation and shifting continues at a rapid rate while the cutters and the gear are rotated slowly in a timed relation with each other with the result that the gear teeth may be finished in one continuous operation on their both sides during one complete revolution of the said gear blank.

The machine in which to do this work is similar to the well known Fellows machine in all its essential parts except that I added a differential mechanism to cause the cutters to shift relative to the gear blank through a predetermined arc B C at the end of the upward stroke and an oppositely directed arc DA at the end of the downward stroke.

As diagrammatically shown in Figure 1 two specially constructed pinion cutters 25 and 26 are clamped at the end of the cylindrical ram 27 in a relatively inverted position. The upper part 28 of the said ram is provided with splines 29 and is thereby prevented from rotating in the sleeve 30 formed integral with the differential side gear 31 while its lower part is free to rotate in the cylinder 32, said cylinder having rack teeth 33 formed in its left-hand side. The differential side gear 31 engages a plurality of differential pinions 34 all mounted in the spider 35 having a corresponding number of projecting arms 36 upon which the said pinions are rotatable. The upper differential side gear 37 is made integral with the upper index worm wheel 38 and is rotatable about the sleeve 30 while the spider arms 36 are held in a cage 39, said cage being integral with the lower worm wheel 40, rotatable about the sleeve 30.

The rack 33 is reciprocated up and down by means of the sector 41 which in turn is oscillated by means of a crank (not shown) about the fulcrum 42. The lower worm wheel 40 engages the worm 43 rotatable about the worm shaft 44 through a limited swing, said partial rotation being checked in either direction by means of two adjustable stops 45 and 46 and the dog 47. In action, the swinging of the dog 47 is timed with the oscillation of the sector 41 in such a manner that during the downward stroke of the ram 27 the dog rests against the stop 45 and stays there until the end of the said stroke. However, at the beginning of the upward stroke the dog is shifted over to butt against the stop 46, thus providing the relief to the cutters 21 and 23, Figure 2 as was previously explained.

The upper index wheel 38 is driven by means of a worm (not shown) mounted upon the shaft 48. The said shaft is also connected through bevel gears 49 and 50, the vertical shaft 51 and the bevels 52 and 53 to the cross shaft 54 from which the rotation is further carried on through the change gears 55, 56, 57 and 58 and the worm 59 to the lower index wheel 60. Said wheel is keyed to the work arbor 61, at the other end of which the gear to be cut 62 is tightly clamped. This unit is rotatably supported in the bed of the machine 63, while the ram and the adjoining differential mechanism is held in the saddle castings 64 and 65. The rack 33 is longitudinally guided but prevented from rotating by suitable guides, not shown.

To understand the operation of this mechanism it is well to consider the fact that the three worm wheels 40, 38 and 60, respectively, are all self-locking or irreversible from which it follows that when either the cutters 25 and 26 or the blank 62 have arrived in any given position, they will stay there and will not "back up" under the pressure of the cut. The object of the differential mechanism is to divorce the periodic rocking motion of the ram 27 about its axis at the end of each stroke from the indexing proper which is accomplished in the required ratio by suitably selecting the change gears 55 to 58. Thus, the differential will permit the indexing motion to continue steadily without interruption and any rotation that might be imparted in the meantime to the differential spider 35 will react upon the cutter only, but not the gear to be cut. I fully realize that the same relative effect might be obtained without the use of a differential, e. g. by rocking the shaft 48, or the shaft 59 longitudinally at the end of each stroke but I prefer a differential mechanism because it gives two added advantages to the machine in that first the cutters 25 and 26 may be rapidly and accurately aligned with the work 62 by rotating the worm 43 by hand (after temporarily releasing the dog 47) and second, the same machine may be used for generation of helical gears by connecting the shafts 42 and 44 by means of a train of change gears without the use of the heavy and expensive helical guides now employed for such purposes.

Figure 3 shows an enlarged view of the pair of cutters 25 and 26 shown in Figure 2. It is to be noted that although each cutter cuts with one side only and each operates at a different side of the gear tooth, yet both cutters are geometrically alike and are interchangeable which fact simplifies their use and manufacture.

The cuttings edge 66 of the tooth 21 is substantially an involute lying in the plane T and is formed as an intersection of the involute helicoidal tooth flank 67 with a concave conical lip surface 68, thus being provided at all its points with an acute lip angle F and a side clearance angle E as shown in detail in Figure 4. The opposite flank 69 of the tooth 21 is not relieved as it does not cut. The upper cutter 26 has also involute cutting edges 70 disposed in the plane T' and, as previously stated is in all respects similar to the cutter 25.

The two planes T and T' are preferably brought as near to each other as possible depending upon the amount of chips or shavings which are taken off the work. It is to be noted that by reducing the gap between the two cutters the length of the stroke required to finish a gear face is correspondingly shortened.

The method of clamping the two cutters together is illustrated in Figure 6. It is necessary to spread out the corresponding cutting edges 66 and 70 in such a manner that they will overlap the non-relieved flanks such as the flank 69 and yet the thickness of the compound cutting tooth should be less than the width of the tooth space in the gear 62 by a distance G H, said distance corresponding to the distance BC in Figure 1. The tops 71 of the cutting teeth do not cut at the bottoms 72 of the tooth spaces in the gear 62.

Figure 5 shows the cutting tooth 21 in side view as seen from its non-relieved flank 69. The tops 71 of the cutting teeth may be ground cylindrical providing the gear teeth are roughed out in the manner indicated in Figure 10 but they must be conical as indicated by the numeral 73, Figure 5, if the gears were roughed out in the manner of Figure 11. As shown in Figure 10 the finished curves 74 diverge from the roughed out curves 75 which leaves a stock to be removed in the form of the cross sectioned wedge-shaped area K thus leaving no stock to remove at or near the bottom of tooth spaces for which reason the tops of cutting teeth may be left cylindrical. However, if the stock to be removed K', Figure 11, extends all along the finished curve 74, the cutter will have to cut with its tops through the short distance P Q and would rub against the metal unless first the tops are formed conical as indicated with the numeral 73, Figure 5, and second, the distance P Q is selected to be less than the throw of the cutter G H, Figure 6. When the last condition is satisfied the cutters will not rub during their idle stroke in spite of the fact that they do a little cutting with their tops or points.

Figure 9 shows the method of cutting helical gears on this principle and in view of what already has been said the diagram is self-explanatory. Attention is called to the condition that in helical work an advantage may be taken of the fact that one side of the cutting tooth possesses a natural rake when intersected with a plane 76 perpendicular to the cutter axis. This fact reduces the manufacturing and maintenance charges of the cutters to a minimum, wherefore I consider this peculiarity to be of a considerable value.

The method of sharpening involute cutters of this kind in order that they may have an acute lip angle F along their involute cutting edges 66 and also to have the said edges disposed in a cutting plane T is diagrammatically shown in Figures 7 and 8. According to this principle, the intersection of the involute helicoid 67 with the plane T is an involute while the intersection of the same plane with the conical grinder 76 is a hyperbola 77, Figure 8. The object is to find a hyperbola having an initial or minimum radius of curvature $r_0$ which will most nearly approximate the involute 66. In such a manner suitable diameter and cone angle M of the grinder 76 are readily determined graphically as it will be readily understood by studying the said two diagrams.

The salient advantages of this method may now be summarized. Although I am using two cutters instead of one previously used, I do not increase the cutter cost, first, because each cutter is cheaper to make, being ground on one side of the tooth only, and because the cutters will last longer on account of the more efficient cutting action. The length of stroke is only slightly increased (see Figure 3) in comparison with the standard method. However, the machine now may be speeded up because the slight rocking of the cutter spindle at the end of each stroke involves less variation in inertia than does the withdrawal of the work from the cutter after each stroke according to the old method.

However, my main object is to produce gears of an utmost accuracy and finish obtainable. It is to be noted that I do not change the center distance of the cutter from the work during the cut which fact will give a perfectly round pitch diameter in the work. The more efficient cutting edges produce a smoother finish, while the novel design of the cutters insures a perfect repetition of the work in mass production after any number of sharpenings of the cutters even in the case when the generatnig curve is not an involute but any other curve.

The thickness of the tooth in the finished gear may be as finely adjusted as it may be required in three different ways, viz (1) by fine adjustment of stops 46, 47 Figure 1, (2) by spreading the blades, Figure 6, or (3) by slightly changing the theoretical center distance from cutters to work, Figure 1.

What I claim as my invention is:

1. A method of generating gears in which two angularly offset cutters are reciprocated relatively to the work while both are rotating in a timed relation and in which the cutters are imparted an additional oscillating movement at the ends of their cutting stroke to cause the said cutters to cut first on one side of the tooth space and then the other.

2. A method of generating gears in which two angularly offset cutters having their cutting faces disposed toward each other are reciprocated relatively to the work while both are rotating in a timed relation and in which the cutters are imparted an additional oscillating movement at the ends of their cutting stroke to cause the said cutters to cut first on one side of the tooth space and then the other.

3. A method of generating helical gears, worms and the like in which two angularly offset cutters are translated along their axis in a helical path relative to the work while both are rotating in a timed relation and in which the cutters are imparted an additional oscillating movement at the end of each cutting period to cause the cutters to cut first on one side of the tooth space and then the other.

4. A method of generating helical gears, worms and the like in which two angularly offset cutters having their cutting faces disposed toward each other are translated along their axis in a helical path relative to the work while both are rotating in a timed relation and in which the cutters are imparted an additional oscillating movement at the end of each cutting period to cause the cutters to cut first on one side of the tooth space and then the other.

In testimony whereof I affix my signature.

NIKOLA TRBOJEVICH.